United States Patent [19]

MacGregor

[11] Patent Number: 5,590,901

[45] Date of Patent: Jan. 7, 1997

[54] METHOD AND APPARATUS FOR VEHICLE TRIM PANEL HAVING HIDDEN AIR BAG DOOR

[75] Inventor: Cline J. MacGregor, Lancaster, Ohio

[73] Assignee: The Goodyear Tire & Rubber Company, Akron, Ohio

[21] Appl. No.: 306,035

[22] Filed: Sep. 14, 1994

[51] Int. Cl.$^6$ ................................................. B60R 21/16
[52] U.S. Cl. .................................... 280/728.3; 280/732
[58] Field of Search ......................... 280/728.3, 728.1, 280/731, 732

[56] References Cited

U.S. PATENT DOCUMENTS

| | | | |
|---|---|---|---|
| 4,246,213 | 1/1981 | Takamatsu | 280/728.3 |
| 5,072,967 | 12/1991 | Batchelder et al. | 280/732 |
| 5,082,310 | 1/1992 | Bauer | 280/732 |
| 5,131,678 | 7/1992 | Gardner et al. | 280/728.3 |
| 5,316,335 | 5/1994 | Gray et al. | 280/728.3 |
| 5,382,047 | 1/1995 | Gajewski | 280/728.3 |
| 5,447,327 | 9/1995 | Jarboe et al. | 280/728.3 |

*Primary Examiner*—Eric D. Culbreth
*Attorney, Agent, or Firm*—Marc R. Dion, Sr.

[57] ABSTRACT

A door and frame in a motor vehicle interior instrument panel or other trim panel is obscured to a vehicle occupant before deployment of an air bag located behind the trim panel. A trim element cover overlaps a joint between the door and frame. The trim element cover is able to self-heal small punctures or slits so that foam materials on an inner side of the panel are prevented from passing through the holes or slits. The frame is stronger relative to the opening due to a reinforcing element applied to the inside perimeter of the opening on the underside of the trim element.

14 Claims, 3 Drawing Sheets

METHOD AND APPARATUS FOR VEHICLE TRIM PANEL HAVING HIDDEN AIR BAG DOOR

BACKGROUND OF THE INVENTION

This invention pertains to the art of vehicle instrument panels or other trim panels and more particularly to a vehicle trim panel having an air bag deployment system mounted therein and in which a door through which the air bag is to be deployed is invisible to vehicle occupants prior to such deployment.

RELATED ART

Automotive vehicles have long utilized restraint systems for the safety of vehicle passengers. Initially, such restraint systems included seat belts which fit over the occupant's lap. Later many restraint systems were modified to add an additional strap, or shoulder harness, which crossed the occupant's chest and further protected them against impacts. Of late, air bag supplemental restraint systems have become increasingly popular. A typical air bag supplemental restraint system includes an inflatable bag which is stored in a deflated condition within the vehicle steering wheel or trim assembly. Upon a relatively severe impact, the air bag is rapidly inflated and deployed into the passenger compartment through various means and openings.

Early air bag deployment systems included a requirement that the opening through which the air bag would be deployed was weakened or somehow configured to insure its successful deployment. Usually the weakened areas were thin spots or cuts in the vehicle interior trim components. The cuts were visible to the vehicle occupants and they detracted from the appearance of the vehicle interior. As such, a need arose for an effective air bag deployment system which was obscured or hidden from the view of vehicle occupants until such deployment.

U.S. Pat. No. 5,072,967 to Batchelder et al. discloses a cover assembly for an air bag restraint which has a smooth cover. An outer cover member has weakened sections on an inboard surface to facilitate deployment of the air bag through the opening created thereby. To reduce the probability of such weakened sections being visible to vehicle occupants, a filler material is placed between the weakened outer cover member and an insert to prevent inward collapse of the outer cover member at the weakened sections. In addition, an insert of aluminum is formed in the filler material and, upon deployment of the air bag, is stressed against the weakened sections of the cover member to deploy the air bag. It is a more complicated system than that of the invention.

U.S. Pat. No. 5,082,310 to Bauer discloses an arrangement enclosure for an air bag deployment opening to be formed in the interior trim structure of an automotive vehicle. The closure includes a substrate section which is weakened in a pattern to form contiguous doors or subsections which split apart along purportedly invisible seams when an air bag is inflated. Upon such inflation, the resulting pressure on the inside of the opening causes the preweakened skin of the foam plastic layer to split apart along the seams, allowing the air bag to be deployed into the vehicle interior. This arrangement requires the skin of the foam plastic layer to be weakened in a matching pattern above the seams in the substrate section. It is believed this embodiment is also more complicated than the present invention and requires that the outer skin of the vehicle interior be weakened over a substantial portion of its area for proper deployment of the air bag.

The present invention contemplates a new and improved vehicle trim panel for use with an air bag deployment system which is simple in design and which overcomes the foregoing difficulties in others while providing better and more advantageous overall results.

SUMMARY OF THE INVENTION

A door and frame in a motor vehicle interior instrument panel or other trim panel includes the panel having an inner side adapted to at least partially enclose an air bag supplemental restraint system. The panel has an outer side having a trim element designed to be viewed by a passenger in the motor vehicle. The trim element overlaps door and frame and obscures a joint between the door and frame when the panel is installed in a motor vehicle. The trim material is able to self-heal small punctures or cuts within it. A foam material on the inner side of the panel is prevented from passing through the punctures or slits in the trim material due to its self-healing characteristic. The frame is reinforced by a reinforcing member to be relatively strong in comparison to the door and deflecting much less than the door when the door and frame are equally loaded.

BRIEF DESCRIPTION OF THE DRAWINGS

The invention may take physical form in certain parts and certain arrangement of parts, a preferred embodiment of which will be described in detail in the specification and illustrated in the accompanying drawings, which form a part hereof and wherein.

DETAILED DESCRIPTION OF THE INVENTION

Figure 1:
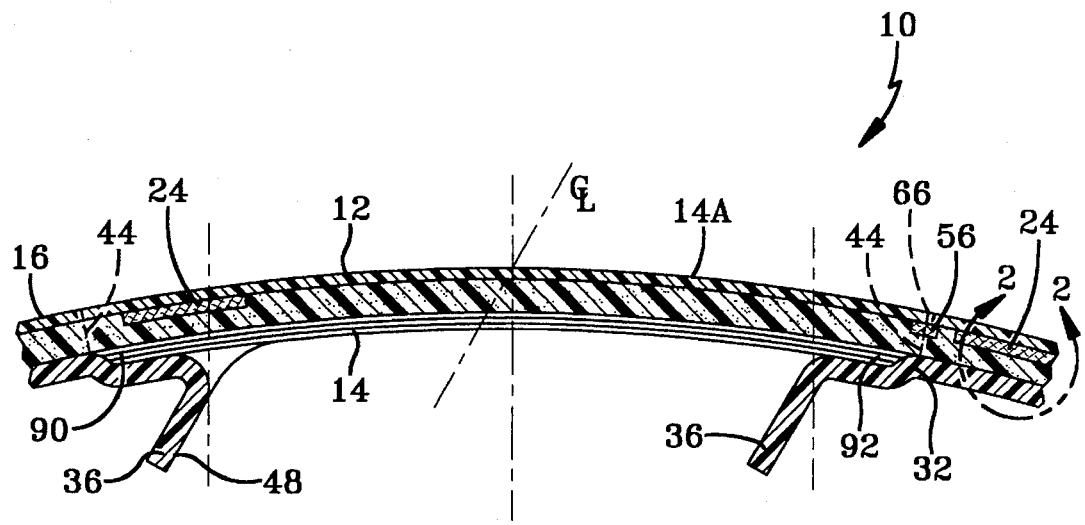
FIG. 1 is a side elevational view in cross-section of a door and frame in a motor vehicle interior trim panel according to the invention.

In the drawings, the same numerals are used to designate the same components or items in several views.

Figure 6:
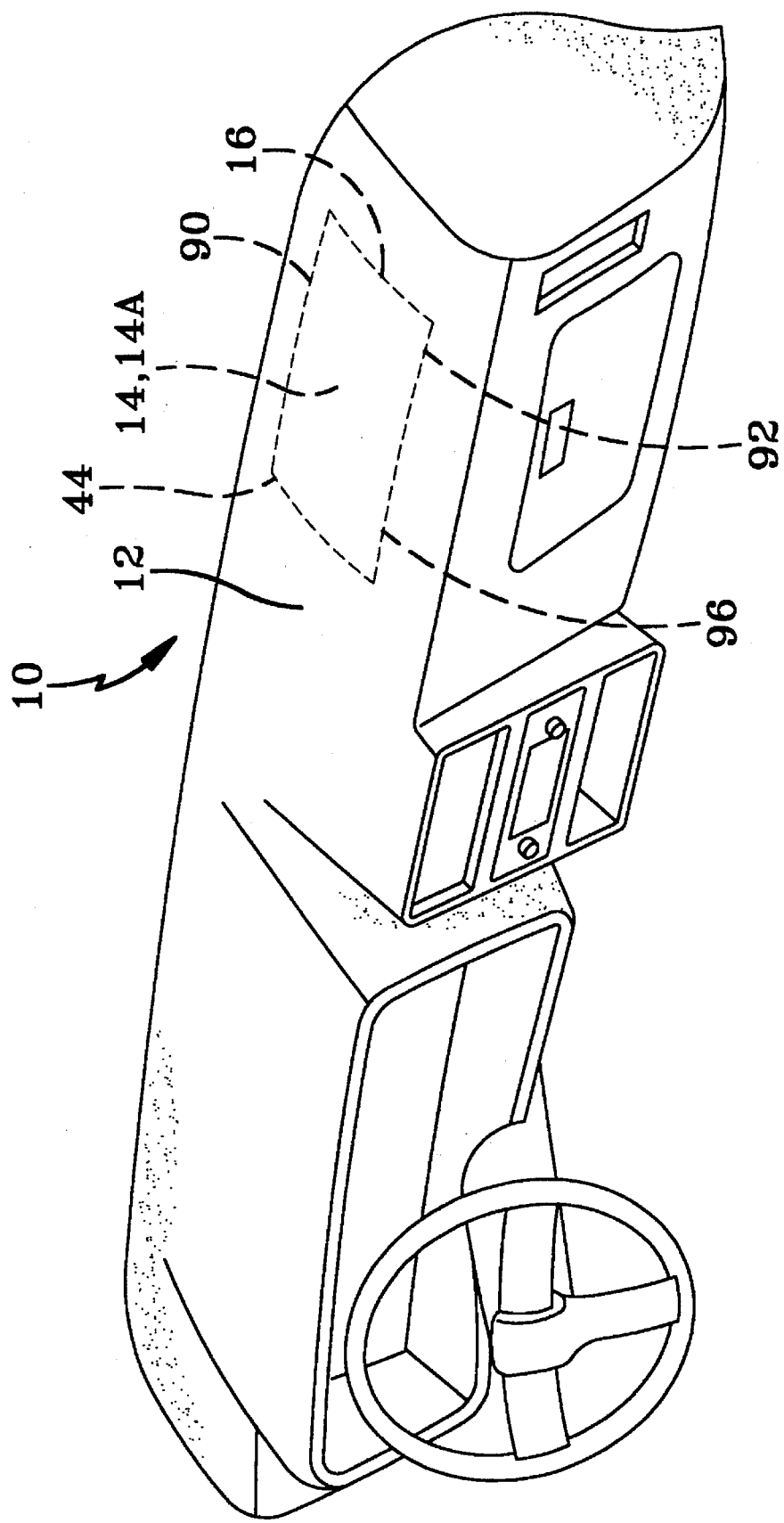
FIG. 6 is a schematic perspective view of a typical vehicle interior in which such door and frame of the invention might be utilized.

With reference to FIG. 6, a typical vehicle interior is illustrated. A prominent feature of such vehicle interior is the interior instrument panel or other trim panel. For example, a typical trim panel 10 includes a trim element 12 which may cover or overlap a door 14 which is hidden from view beneath phantom joint 44.

The door 14 is inserted into and adhesively bonded to a substrate 32. The door 14 should be made of a rigid material of good impact resistance at both high and low temperatures. A preferred material is a Thermoplastic Urethane and Nitrile-Butadiene Rubber (hereinafter TPR-NBR) blend or a metal such as steel or aluminum.

The frame 16 is generally referred to as the area of the trim panel 10 near or contiguous to area 14A and which works together with the door 14 to support its movement, just as a door and frame in a house or other dwelling work together. As illustrated by the dotted lines, it is preferable that the door 14 be hidden from view by occupants in the vehicle interior until deployment of the air bag through trim panel 10 through joint 44.

Figure 2:
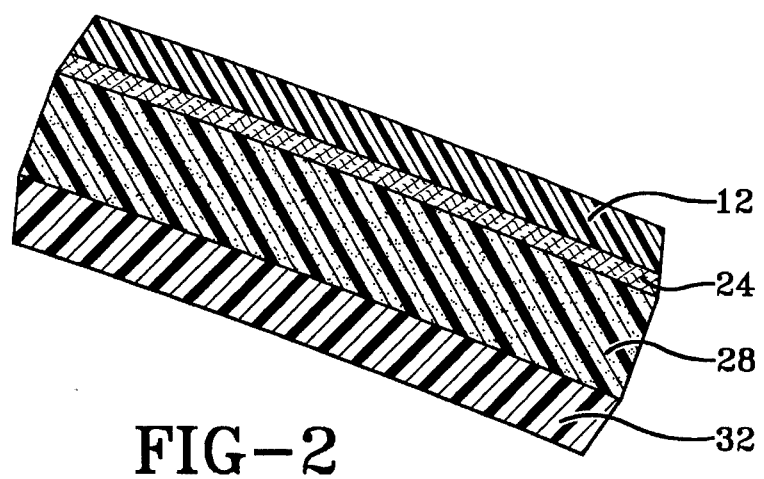
FIG. 2 is a cross-sectional view of the trim panel shown in FIG. 1 and taken at section 2—2.

With reference to FIGS. 1 and 2, the trim panel 10 includes a trim element 12 on an outer side of the trim panel 10. In the preferred embodiment, the trim element 12 is 1.5 mm thick and is made of a trim material. The trim material is preferably polyurethane or polyurea with an outer paint coating. The paint coating is also preferably a two component polyurethane. An alternative construction would be a cast vinyl trim element 12 with or without a coating. A further alternative would be a trim element 12 made of an Thermoplastic Olefin (TPO) sheet or an TPO that has polypropylene foam laminated to it. In the preferred embodiment, the trim element 12 is manufactured by spraying the urethane into a mold as will be described hereafter.

With continuing reference to FIGS. 1 and 2, the next element of the trim panel 10 is a scrim or reinforcing member 24. As will be later discussed and illustrated in FIGS. 3 and 5, the reinforcing member 24 is generally rectangular and positioned around the area 14A much like a frame is positioned around a picture, although the reinforcing member 24 is to be distinguished from the frame 16. The reinforcing member 24 can be made of any appropriate material such as scrim might be made of, but is preferably made of a fabric such as nylon or polyester. The preferred reinforcing member 24 has a pressure sensitive adhesive to attach it to the trim element 12. In an alternate embodiment the reinforcing member 24 could utilize a two component 100% solids urethane adhesive which is spread onto the trim element 12. The reinforcing member 24 is then pressed into the adhesive and pressed into position.

With continuing reference to FIGS. 1 and 2, the next layer of the trim panel 10 is a foam material 28. The foam material 28 can be any appropriately chosen adhesive foam, although the preferred foam is a two-component polyurethane foam based on polyether/polyesther type polyols with polymeric 4,4'-Diphenylmethane Diisocyanate, hereinafter MDI. In the preferred embodiment, the foam is between 5 mm and 6 mm thick and has a typical foam density of between 5.0 and 20.0 pounds per cubic foot (0.08 grams/cubic centimeter-0.32 grams/cubic centimeter).

Finally, the panel 10 includes the substrate 32 which is normally manufactured of plastic. The preferred material is SMA copolymer such as is available from Arco under the trade name Dylark. Alternate materials include GE's Noryl EM-7304 polycarbonate, steel, aluminum, magnesium, reinforced RIM or S-RIM urethanes. The substrate 32 should provide a molded-in chute for the air bag, i.e. flanges 36. The flanges 36 are formed into the substrate 32 and are useful for attaching the air bag canister (not shown). The substrate has a thickness of 3 mm to 4 mm.

Figure 3:
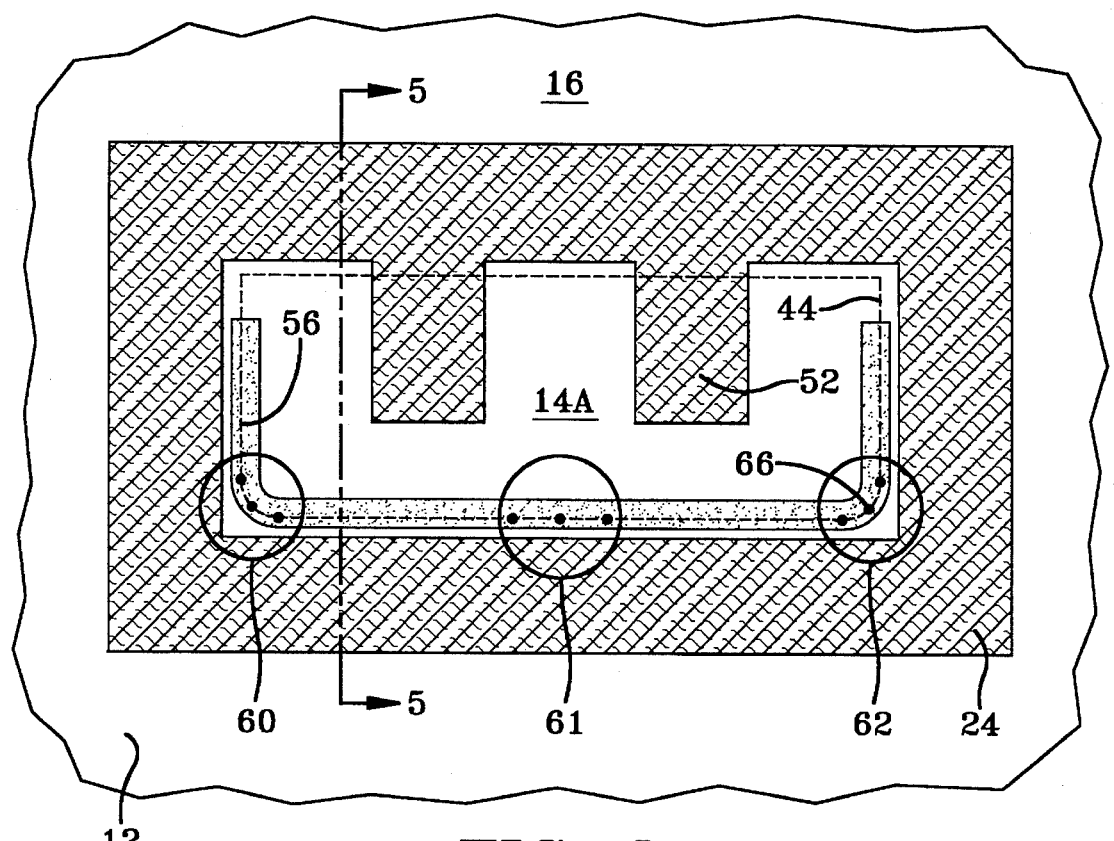
FIG. 3 is a plan view of the underside of a reinforced trim element according to the invention.
Figure 5:
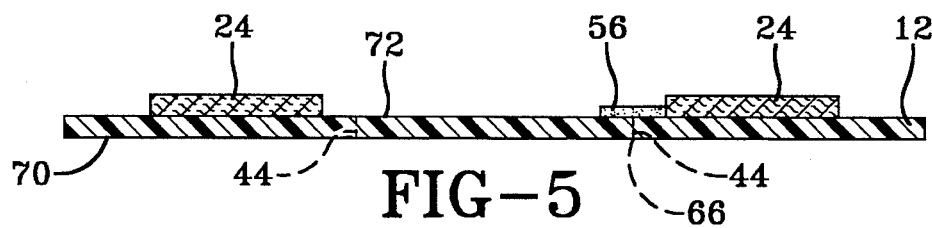
FIG. 5 is a cross-sectional view taken along line 5—5 of FIG. 3.

With reference to FIGS. 3 and 5, the reinforcing member 24 and its function will be described in more detail. FIG. 3 is a bottom view of the inner side of reinforced trim element 12. The location and configuration of area 14A and frame 16 is seen by the joint 44 which separates them and forms their respective boundaries.

As can be seen with reference to FIG. 3, the reinforcing member 24 is generally rectangular and surrounds area 14A much like a picture frame surrounds a picture. The reinforcing member performs an important and novel function in that it strengthens the frame 16 around area 14A so that the frame 16 near the joint 44 is relatively strong compared to area 14A. Therefore, when an air bag is inflated in the process of being deployed door 14 moves toward trim element 12. The stresses generated thereby and impressed upon 14A and frame 16 are approximately equal, but the ability of area 14A to withstand those stresses without significant deflection is much less than that of the frame 16. The force applied by the upward motion of the door 14 and foam 28 immediately thereabove causes the trim element 12 to tear along joint 44. Therefore, area 14A, along the joint 44 breaks loose, allowing the air bag to be deployed. The door 14 is bonded onto the substrate 32 around upper half 90 of door 14 and lower half 92 of door 14. A first stronger adhesive is used for the upper half 90 of the door 14 while a second weaker adhesive is used for the lower half 92 of the door 14. This is to encourage the leading edge 96 of the door 14 to open before the upper half of the door 14.

In a preferred embodiment of the invention, the door 14 is hinged at one side via a door hinge 48. In such an embodiment, the reinforcing member 24 includes at least one reinforcing member hinge 52. As shown in FIG. 3, reinforcing member hinge 52 extends beneath a portion of area 14A by crossing under phantom joint 44. Upon the occasion of the deployment of the air bag, the reinforcing member hinge 52 assists and restrains area 14A foam 28 and the door 14 in their opening and revolution about the door hinge 48.

With continuing reference to FIG. 3, another important aspect of the preferred embodiment of the invention is a release element 56 which is configured on the inner side of the trim element 12 along the joint 44. Preferably, the joint 44 is coaxial with a centerline of the release element 56. A preferred release element 56 is a wax-based mold release such as is available from Chemtrend and sold under the trade name XCTWA4090. The release element 56 assists the separation of the door assembly comprising area 14A, foam 28, and door 14, from the frame 16 upon deployment of the air bag. It also performs the important function of preventing foam material 28 from adhering to the trim element 12 at joint 44 or from passing through slits or punctures 66 in the joint 44. As shown in FIG. 3, release element 56 prevent the foam material 28 from adhering to trim element 12 along a substantial portion of joint 44.

Figure 4:
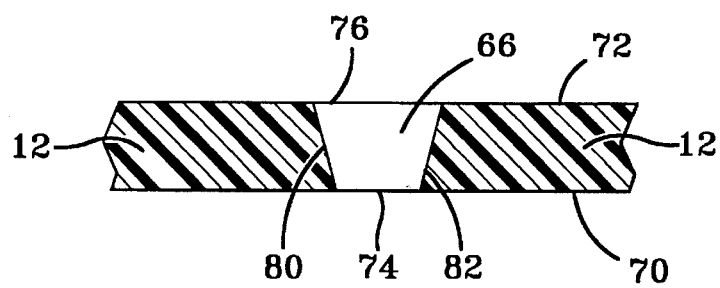
FIG. 4 is a cross-sectional view of the initial configuration of slits in the trim element taken through the joint.

With continuing reference to FIGS. 3 and 4, a further aspect of the preferred embodiment includes weakened regions 60,61,62. Within the weakened regions 60,61,62 are weakening means for weakening the trim element 12, such as punctures or slits 66. The slits 66 have an initial configuration, immediately after their formation, as illustrated in FIG. 4. The trim element 12 has an outer side 70 and an inner side 72. This initial configuration of the slit 66 is generated by a knife or puncturing tool having the general configuration of the slit 66. More specifically, the cutting tool or initial configuration of the slit 66 has a outer surface 74 having a width of about 1 mm and an inner surface 76 having a width of about 2 mm.

One of the most important aspects of the invention is the ability of the slit 66 to transform from its initial configuration, as shown ill FIG. 4, to a second configuration where the slit 66 is undetectable from outer side 70 of trim element 12. In such case, the sidewalls 80,82 of the slit 66 move toward each other until they are adjacent, effectively closing the slit 66. This quality or characteristic is defined herein as "self-healing" meaning the punctures or slits 66 used to create the weakened regions 60,61,62 remain invisible from the outer side 70 of the trim element 12. This self-healing characteristic is dependent on the materials used for the trim element 12. The self-healing characteristic of the trim material also helps prevent foam material 28 from passing through the trim material. As stated previously, in the preferred embodiment, the trim material is a urethane or polyurethane material which is preferably sprayed to create the trim element 12. While the slit 66 appears closed and essentially invisible, the trim element 12 is weakened in certain areas by the slits 66.

A preferred method of manufacturing the trim panel 10 will now be described. The trim element 12 is placed or sprayed into a mold. Trim element 12 is reinforced around a phantom joint 44 with a reinforcing member 24. Slits 66 are formed in trim element 12 along phantom joint 44. Slits 66 are initially wider toward inner side 72 of trim element 12 and narrower toward the outer side 70 of trim element 12. Release element 56 is applied to the inner side 72 of trim element 12 along a portion of phantom joint 44 at least covering slits 66. The substrate 32 with the adhesively bonded TPU-NBR door is positioned on the lid of the mold. The foam material 28 is then introduced onto the inner side of the trim element 12 either by pouring into the open mold or by injecting it into the center of a closed mold. The urethane foam then reacts and expands to fill the mold and bond the substrate 32 and trim element 12 together. After the foam has hardened, the mold is opened and the finished part removed.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

It is claimed:

1. A trim panel in a motor vehicle having an inner side adapted to at least partially enclose an air bag supplemental restraint system, the panel having an outer side designed to be viewed by a passenger in the motor vehicle, the panel comprising:

a trim element disposed on the outer side of the trim panel having a first area being distinguished from the remainder of the trim element by a predetermined joint, the joint being obscured from view of the passenger, the trim element having slits therein from an outer side to an inner side along said joint, the trim element being made of a trim material being capable of changing the slits from an initial, open configuration to a second, closed configuration by moving opposing sides of the slits together, whereby the slits are undetectable by the passenger;

a substrate disposed on the inner side of the trim panel, the substrate having an opening therein for the deployment of the air bag;

a door bonded along its periphery to the substrate around the opening, the door being positioned beneath the joint; and, foam material on the inner side of the panel disposed between the substrate and the trim element, the foam material being prevented from passing through the slits in the trim element due to the movement of the opposing sides of the slits.

2. The panel of claim 1 wherein the initial configuration of the slits is characterized by a first gap in the inner side and a second gap in the outer side, the first gap being wider than the second gap.

3. The panel of claim 1 further comprising a reinforcing member, said reinforcing member being attached to the inner side of the trim element and surrounding the first area.

4. The panel of claim 3 wherein the reinforcing member comprises reinforced fabric.

5. The panel of claim 4 wherein said reinforcing member is attached to the trim element by adhesive.

6. The panel of claim 4 further comprising a door hinge along one side of the door and a reinforcing member hinge, the reinforcing member hinge extending from the reinforcing member to the first area of the trim element.

7. The panel of claim 1 further comprising a release element, the release element positioned between the trim element and the foam material along a portion of the joint, the release element preventing the foam from being adhered to the trim element along the portion of the joint.

8. The panel of claim 7 wherein the release element is a wax-based mold release.

9. The panel of claim 1 wherein the door is bonded along one portion of the periphery thereof with a stronger adhesive and along the remainder with a weaker adhesive.

10. The trim panel of claim 1 wherein the foam material is a two component polyurethane foam based on polymeric 4-4'-Diphenylmethane Diisocyante.

11. The trim panel of claim 1 wherein the foam material is an adhesive foam.

12. The trim panel of claim 1 wherein the trim material is urethane.

13. A method of producing a trim panel in a motor vehicle, the panel having an inner side adapted to at least partially enclose an air bag supplemental restraint system, the method comprising the steps of:

forming a trim element of a trim material;

reinforcing an inner side of the trim element around a generally rectangular first area with a reinforcing member, the perimeter of the first area defining a joint;

cutting a slit in the trim element which extends from the inner side to an outer side of the trim element along the joint, the slit having a first configuration characterized by a wider gap in the inner side and a narrower gap in the outer side, the trim material being capable of moving opposing sides of the slit together so that the slit is imperceptible when the trim element is viewed from the outer side;

applying a release element to the inner side of the trim element along a portion of the joint, the release element at least covering the slit;

adhesively bonding a generally rectangular door to a periphery of an opening in a substrate;

loading the reinforced trim element into a mold;

loading the substrate into the mold so that the door bonded to the substrate will be aligned with the joint in the trim element upon closure of the mold; and, introducing adhesive foam onto the inner side of the trim element.

14. The method of claim 13 wherein the release element is a wax-based mold release.

\* \* \* \* \*